UNITED STATES PATENT OFFICE.

CHRISTIAN KONOLD, OF EVERGREEN HAMLET, AND FRANK DEMING, OF ALLEGHENY CITY, PA.; SAID DEMING ASSIGNOR TO SAID KONOLD.

BINDER'S REEL.

SPECIFICATION forming part of Letters Patent No. 238,403, dated March 1, 1881.

Application filed May 15, 1880. (No model.)

*To all whom it may concern:*

Be it known that we, CHRISTIAN KONOLD, of Evergreen Hamlet, and FRANK DEMING, of Allegheny City, both in the county of Allegheny and State of Pennsylvania, have invented a new and useful Improvement in Binders' Reels; and we do hereby declare the following to be a full, clear, and exact description thereof, reference being had to the accompanying drawings, forming a part of this specification, in which—

Figure 1 is a perspective view of our improved tool. Fig. 2 is a cross-section, and Fig. 3 is a view of the spool.

Like letters of reference indicate like parts in each.

Our invention consists of an improved tool for binders' use in binding sheaves, and also for tying up vines and other similar purposes. It is composed of a case made in two parts, pivoted together, inclosing a spool, and provided with handles at one end, a pair of clamping and shearing jaws at the other end, and with a crank for turning the spool.

To enable others skilled in the art to make and use our invention, we will describe its construction and manner of use.

The case $a$ is formed of two halves, $a'\ a'$, pivoted together. Upon each there is a handle, $b$, at one end, and a clamping-jaw, $c$, at the other, and at the side of each clamping-jaw a shear, $d$. One of the clamping-jaws is provided with a hole for the passage of the wire, and which serves as a guide to preserve the line of wire practically parallel with and in juxtaposition to the end thereof which is held by the clamp, so that the wire may be twisted to fasten the same. Inside of the case $a$ is a spool, $e$, which consists of a shaft, $e'$, and side flanges, $e^2$.

At one end of the spool is a small gear-wheel, $e^3$, with which it is driven by means of the crank $g$ and gear-wheel $g'$. The wire is coiled around the shaft $e'$, the spool placed inside of the case, and the end of the wire passed out through a hole, $h$, in the clamping-jaws.

The two parts of the circular case $a$ are secured together by means of the bolt $i$ passing through it and through the hollow stem $e'$ of the spool $e$.

The manner of using our tool is as follows: The wire is drawn out by hand to a sufficient length to encircle the sheaf or vine or other thing to be bound, around which it is passed, and then brought back and clamped between the clamping-jaws. The spool is then turned backward by means of the crank, so as to draw the wire up tightly. The end of the wire is held tightly between the clamping-jaws, while the wire itself passes freely through the hole $h$. When the wire is drawn up sufficiently tight it is fastened by giving it a twist by turning the tool, and then it is cut off by bringing it between the shears and closing them upon it.

It is apparent that the construction of the device may be varied in many ways—as, for instance, the crank may be placed on the end of the hollow shaft $e'$, the flanges may be removed from off the shaft $e'$ and be attached to the sides of the case $a$, and the hole $h$, instead of being through the jaw, may be through the front of the case $a$. Many other similar changes of construction will be apparent to the skillful mechanic.

This tool is not only useful for the purpose indicated, but also in stores as a convenient method of storing wire for sale. Wire is often bought in short lengths, and if coiled in one of these tools the required length could be drawn out and cut off with much less trouble and expenditure of time than is now required. It may also be used for twine and for large wire. By increasing its size it is also adapted for use as a wire-worker's tool.

What we claim, and desire to secure by Letters Patent, is—

1. The combination, in a binder's tool, of clamping-jaws for holding the free end of the wire, a guide for keeping the line of wire practically parallel with, and in juxtaposition to, the clamped end, so that the same may be twisted together, and a reel for containing the wire and taking up the slack thereof, substantially as and for the purpose specified.

2. The combination, in a binder's tool, of a reel, a pair of clamping-jaws, and a pair of shears attached to said jaws, substantially as and for the purpose described.

3. A binder's tool having a reel-case composed of two parts, pivoted to each other and operated by suitable handles, substantially as and for the purposes described.

In testimony whereof we have hereunto set our hands.

CHRISTIAN KONOLD.
FRANK DEMING.

Witnesses:
M. G. CLARK,
PERRY M. GLEIM.